(12) United States Patent
Pasquero et al.

(10) Patent No.: US 9,249,272 B2
(45) Date of Patent: *Feb. 2, 2016

(54) HIGH-PERFORMANCE THERMAL INSULATION MATERIALS

(71) Applicant: SAINT-GOBAIN ISOVER, Courbevoie (FR)

(72) Inventors: Daniela Pasquero, Paris (FR); Claude Da Silva, Aulnay Sous Bois (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,807

(22) Filed: Mar. 12, 2015

(65) Prior Publication Data

US 2015/0183947 A1    Jul. 2, 2015

Related U.S. Application Data

(63) Continuation of application No. 13/576,424, filed as application No. PCT/FR2011/050222 on Feb. 3, 2011, now Pat. No. 9,045,609.

(30) Foreign Application Priority Data

Feb. 3, 2010    (FR) ..................... 10 50744

(51) Int. Cl.
*E04B 1/74*    (2006.01)
*E04B 1/76*    (2006.01)
*C08J 9/30*    (2006.01)
*C08J 9/00*    (2006.01)

(52) U.S. Cl.
CPC .............. *C08J 9/0066* (2013.01); *C08J 9/0061* (2013.01); *C08J 9/30* (2013.01); *E04B 1/7604* (2013.01); *C08J 2205/026* (2013.01); *C08J 2321/02* (2013.01); *C08J 2333/00* (2013.01); *C08J 2425/08* (2013.01); *C08J 2433/08* (2013.01); *E04B 2001/742* (2013.01)

(58) Field of Classification Search
CPC ....... E04B 1/74; E04B 1/76; E04B 2001/742; E04B 1/7604; C08J 9/0066; C08J 9/30; C08J 9/0061; C08J 2321/02; C08J 2205/026; C08J 2333/00; C08J 2425/08; C08J 2466/08
See application file for complete search history.

(56) References Cited

U.S. PATENT DOCUMENTS

| | | | |
|---|---|---|---|
| 5,124,364 A | 6/1992 | Wolff et al. | |
| 5,137,927 A | 8/1992 | Wolff et al. | |
| 5,569,513 A | 10/1996 | Fidler et al. | |
| 5,696,174 A | 12/1997 | Chao et al. | |
| 6,080,475 A | 6/2000 | Frank et al. | |
| 7,101,607 B2 | 9/2006 | Mollendorf et al. | |
| 7,118,801 B2 | 10/2006 | Ristic-Lehmann et al. | |
| 9,045,609 B2 * | 6/2015 | Pasquero et al. | .......... E04B 1/74 |
| 2009/0029147 A1 | 1/2009 | Tang et al. | |
| 2012/0112117 A1 | 5/2012 | Vo et al. | |

FOREIGN PATENT DOCUMENTS

| | | |
|---|---|---|
| WO | 96 25475 | 8/1996 |
| WO | WO03/064507 A | 8/2003 |
| WO | 03 097227 | 11/2003 |

OTHER PUBLICATIONS

International Search Report Issued Jun. 14, 2011 in PCT/FR11/50222 Filed Feb. 3, 2011.

* cited by examiner

*Primary Examiner* — Anthony J Green
(74) *Attorney, Agent, or Firm* — Oblon, McClelland, Maier & Neustadt, L.L.P.

(57) ABSTRACT

Thermal insulation material capable of being obtained from the mixture of at least the following elements:
an aqueous foam;
silica aerogel particles; and
at least one binder selected from an organic binder and a mineral binder.

17 Claims, No Drawings

HIGH-PERFORMANCE THERMAL INSULATION MATERIALS

This application is a continuation of U.S. patent application Ser. No. 13/576,424, filed on Aug. 1, 2012 and issued on Jun. 2, 2015 as U.S. Pat. No. 9,045,609, which is a National Stage entry under 35 USC 371 of PCT/FR11/050222, filed on Feb. 3, 2011, and claims priority to French Patent Application No. 10 50744, filed on Feb. 3, 2010.

The present invention relates to a high-performance thermal insulation material, its manufacturing process, and also its use in the field of construction for insulating the walls (exterior or interior) of buildings, or for filling cracks in construction materials.

Currently, in new construction and in renovation, in order to meet the specifications of building works, it is essential to develop novel materials that are particularly high-performance in terms of thermal insulation. The development of novel materials that meet such a requirement is experiencing unprecedented expansion nowadays. However, it is often essential for such more insulating construction materials to retain, or even improve, the properties desired for the construction of buildings (dwellings, etc.), especially in terms of lightening of the load, mechanical strength, or for example sound insulation.

Furthermore, a wide variety of thermal insulation products are known these days. Among the commonly used insulation products, mention may mainly be made of fibrous insulation, based on natural or synthetic fibers such as glass wool or rock wool, cellular insulation of the type made of expanded or foamed polymer such as expanded or extruded polystyrene, or polyurethane, and aerogel mats, that is to say aerogels in a layer in the form of a blanket formed of mechanically strong entangled fibers, but for which it is difficult to imprint a given shape thereon.

The silica aerogels are among the highest performing insulation products. However, their mediocre mechanical properties force them to be used in combination with a reinforcing agent. Their usage has continued to be not very widespread until now, since their use in combination with customary insulation products (polystyrene, etc.) has not made it possible to obtain commercializable products, as highlighted further on in the text. Silica aerogels, that may attain thermal conductivities dropping to 12 mW/m·K, are produced from a silica gel dried under particular conditions. They may be in the form either of translucent granules which must be protected from any handling, with an application in insulating glazing, or of fine powder and cannot be used as is for constituting conventional insulation products such as (thermal, acoustic, etc.) insulation panels for insulating the walls of buildings.

With a view to improving the thermal performances of polystyrene, it has already been proposed to manufacture composite materials containing a mixture of polystyrene and aerogel.

Thus, found in EP 489 319 are examples of composite foam comprising between 27 and 47% by volume of supercritical silica aerogel in the form of particles of 2-5 mm and between 53 and 73% by volume of styrene polymer foam. The products are quoted with a thermal conductivity of from 20 to 27 mW/m·K at 10° C.

However, these composites cannot be produced in a large quantity, as is required for the manufacture of commercial products, since the aerogel is of friable nature that does not tolerate the friction experienced during a mixing operation with the polymer beads. Moreover, the mechanical strength qualities of such products remain insufficient and are significantly degraded with the increase in the proportion of aerogel.

Also known from patent applications US 2008/0287561 and WO 03/097227 is the direct incorporation of a polymer binder having aerogel particles. Application US 2008/0287561 relates more particularly to silica aerogel composites such as composite materials produced from aerogels combined with syntactic foams without hollow (glass or thermoplastic) microspheres. These syntactic foams are obtained in particular by virtue of the use of an aqueous polymer ("water-based polymer") in the mixture. The thermal performances obtained by this technique are limited, the samples obtained by the procedure described in US 2008/0287561 not making it possible to obtain thermal conductivities of less than 60 mW/m·K.

Application WO 03/097227 also relates to syntactic foams obtained in particular by virtue of the use of an aqueous polymer binder ("aqueous binder") in the form of foam. In this case, the foams are syntactic foams generated by the use of hollow (glass or thermoplastic) microspheres. Such syntactic foams that include the aforementioned microspheres are particularly expensive. Furthermore, here too, the thermal performances obtained by this technique are limited, given that the microspheres used degrade the high thermal performances provided by the aerogel.

The present invention aims to propose a novel type of insulation material that displays excellent thermal performances, while retaining a good mechanical strength with low densities for a lightening of the load. The present invention also aims to propose an innovative material that remains easy to spread during the curing thereof and on which it is possible to confer all the desirable shapes, especially by molding.

In this regard, and in order to overcome the drawbacks of the prior art, one subject of the present invention is a thermal insulation material capable of being obtained from the mixing of at least the following elements: an aqueous foam, silica aerogel particles, an organic binder and/or a mineral binder.

The inventors have unexpectedly demonstrated that the thermal insulation materials comprising silica aerogels prepared from aqueous foams make it possible to achieve thermal performances close to those of aerogels as is, with densities that are compatible for use as a lightweight material. Such a thermal insulation material also displays very good mechanical performances, especially in terms of compressive strength and deformability. The insulation material of the invention is therefore compatible both for use as a filling material and for use at the surface, in particular as a facing.

The silica aerogels used within the context of the present invention are prepared from granules of commercial aerogel, for example the aerogels sold by Cabot (Nanogel® TLD 302, etc.). They may be used after milling and screening or alternatively be used directly without any conversion. The aerogels are generally obtained from a gel manufactured, for example via hydrolysis in the presence of a solvent then gelation with catalysis, from an organic or inorganic precursor, then via evaporation or extraction of the liquid forming the gel (for example at high temperature and/or under pressure) in order to replace this liquid with a gas (in particular air). The aerogels may be produced in particular in the form of foam, granules, blocks that are divided where necessary.

In addition to the aqueous foam and silica aerogels, the mixture intended for the preparation of the thermal insulation material comprises an organic and/or mineral binder. It is used, for example, for enabling the bonding of the particles to one another and/or for the bonding of the particles to the rest of the structure of the material in the final product. In the remainder of the text, the term binder used alone will either refer to a mineral binder, an organic binder or to a system of binders belonging to at least one of these two families.

Preferably, the thermally insulating material described previously is capable of being prepared from at least the following elements, taken in amounts expressed as a weight percentage relative to the total weight of the mixture (overall mixture used for the preparation of the insulation material), varying from 25 to 75% for the aqueous foam, from 5 to 35% for the silica aerogel particles and from 5 to 35% for the binder.

Advantageously, the amount of aqueous foam varies from 35 to 65%, preferably from 45 to 55% and indeed is even 50%.

Similarly, the amount of silica aerogel particles varies advantageously from 17 to 25%, preferably from 21 to 23% and indeed is even 22%.

In a similar manner, the amount of binder varies advantageously from 17 to 25%, preferably from 21 to 23%, and indeed is even 22%.

All the combinations of the ingredients taken within the aforementioned ranges of values are also possible.

The term "aqueous foam", within the meaning of the invention, defines any type of foam obtained by a disordered packing of gas bubbles in an aqueous phase, in particular in a liquid of soapy appearance. Such a liquid of soapy appearance comprises water and at least one surfactant compound.

The aqueous foam used to obtain the insulation material of the invention is preferably prepared from a mixture comprising:
at least one cationic surfactant salt selected from one of the following compounds of general formula:

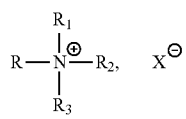
(I)

for which R is an aliphatic chain having 8 to 24 carbon atoms; $R_1$ is a group selected from alkyls comprising 1 to 16 carbon atoms, hydroxyalkyls comprising 1 to 16 carbon atoms, a benzyl group, a group which, taken together with the nitrogen of formula (I), gives a heterocycle optionally substituted by at least one fluorine atom; $R_2$ and $R_3$ are selected from the groups constituted of an alkyl group comprising 1 to 6 carbon atoms, hydroxyalkyls comprising 1 to 6 carbon atoms, a hydrogen atom, a benzyl group, a group which, taken together with the nitrogen of formula (I), gives a heterocycle optionally substituted by at least one fluorine atom; and $X^-$ is a counteranion;
at least one anionic surfactant salt selected from one of the following compounds of general formula (II):

R—$X^-$,$Y^+$ (II)

for which R is an aliphatic chain having 10 to 24 carbon atoms; $X^-$ is a group bearing a negative charge selected from carboxylate, sulfate and phosphate groups; and $Y^+$ is a countercation selected from ammonium, sodium and potassium groups.

Preferably, the ratio of the weight content of the cationic surfactant salt to the weight content of the anionic surfactant salt varies from 0.05:1 to 15:1, preferably from 0.2:1 to 5:1, or even from 0.4:1 to 2.5:1.

Advantageously, the cationic surfactant salt is selected from alkyltri-methylammonium salts containing an alkyl group that comprises 10 to 22 carbon atoms, and is preferably selected from at least one of the following compounds: dodecyltrimethylammonium bromide (or chloride), tetradecyltrimethylammonium bromide (or chloride), hexadecyltrimethylammonium bromide (or chloride), octadecyltrimethylammonium bromide (or chloride), cetyltrimethylammonium bromide (or chloride), cetylbenzyldimethylammonium chloride, cetyltriethyl-ammonium bromide and (tallow)trimethylammonium chloride.

Preferably, the anionic surfactant salt is (tallow)trimethylammonium chloride.

Advantageously, the aforementioned anionic surfactant salt(s) is (are) selected from at least one of the following compounds: ammonium stearate, potassium stearate and sodium stearate.

It is also possible to use, alternatively or additionally, anionic surfactants constituted of an alkali metal salt of an organic acid bearing an aliphatic chain comprising 12 to 24 carbon atoms, advantageously an (optionally substituted) sodium, potassium or ammonium salt.

The $X^-$ group of the general formula (II) may be a carboxylate, sulfate or sulfonate group. Mention may be made of carboxylate salts comprising 12 to 24 carbon atoms, selected for example from the salts: of myristate, of palmitate, of stearate, of oleate, or of the conjugate base of behenic acid; and in particular the selected anions derived from soap via hydrolysis of triglyceride (saponification). Mention may also be made of other carboxylates such as those resulting from the treatment of tallow fatty acids, including in particular palmitate, stearate and oleate. Other conjugate bases of fatty acids may also be used such as, for example, the soaps/shower gels comprising fatty acids originating from natural sources such as tallow, coconut oil or else palm oil.

Preferably, the cationic and anionic surfactants are included in two different aqueous phases and are mixed in the amounts indicated previously to form the foam.

The preparation of such an aqueous foam is described in patent application WO 96/25475.

The aqueous foam may also be prepared from two-component kits sold by Allied Foam (references: 425A and 510B). Such kits are composed of a first aqueous mixture containing an anionic surfactant and of a second aqueous mixture comprising a cationic surfactant and a latex.

The inventors have shown that these aqueous foams comprising a cationic surfactant and an anionic surfactant have the advantage of remaining particularly stable during the incorporation of the silica aerogel particles. It becomes quite easy to control the amount of silica aerogel to be introduced into the mixture for the preparation of the insulation material of the invention. This aspect is particularly advantageous, since it makes it possible to have access to a wide range of different products. Indeed, since silica aerogels are quite expensive, it is preferable to be able to control their content in order to be able to prepare products that are more accessible in terms of cost, without degrading the thermal properties and the mechanical strength too much. Increasing the foam/aerogel ratio also makes it possible to prepare systems that are further aerated, therefore that are more compressible when this is associated with an intrinsic flexibility of the material, which is sought after for certain uses, such as for example floor insulation (especially acoustic insulation) or for filling structures of cellular type. The use of stable foams also makes it possible to obtain a material that remains a low-density material, even with lower silica aerogel contents.

Other aqueous foams may be used within the context of the present invention, for example the Gillette Foam Regular foam.

It is also possible to use aqueous foams comprising a water/glycerol mixture, one or more surfactants (such as defined previously) and one or more zwitterions. Among the zwitterions, mention may be made of amino acids or derivatives, or else molecules synthesized from amino acids. Mention may also be made of betaines such as phosphorus betaines and/or ammonium betaines.

Preferably, such aqueous foams comprise a mixture of 25 to 55% of glycerol (expressed as weight percentages relative to the total weight of foam).

Also preferably, these aqueous foams comprise less than 5%, advantageously less than 2%, indeed even less than 1% of preferably anionic surfactant.

Also preferably, these aqueous foams comprise less than 5%, advantageously less than 2%, indeed even less than 1% of zwitterion preferably chosen from ammonium betaines.

All the combinations of these various ingredients are also possible by varying the contents in particular as expressed previously.

More preferably, such an aqueous foam comprises 35 to 45% of glycerol, ideally 40%, mixed with less than 0.5% of dodecyl polyoxyethylene-3-sulfate, less than 0.5% of cocamidopropyl betaine and less than 0.05% of myristic acid.

All the combinations of foams mentioned previously within the context of the invention are also possible in combination in the mixture intended to prepare the thermal insulation material.

Preferably, the binder used in the composition used to obtain the thermally insulating material according to the invention is an organic binder, preferably a latex.

More preferably still, the thermal insulation material according to the invention is obtained from a mixture comprising at least one organic binder and at least one inorganic binder. Advantageously, the weight of organic binder represents a content of less than 25% relative to the total amount by weight of (organic and inorganic) binder, preferably this content is less than 15%, more preferably it is less than 10%, indeed even 8%.

Very particularly preferably, the binder(s) may be composed solely of inorganic material(s), which guarantees the flame-retardant properties of the insulation material.

The term "latex" within the meaning of the present invention denotes, in particular, the latex polymers customarily used in construction materials. Among the polymers that may be incorporated into the composition of such a powder, mention may be made, for example, of elastomer lattices, thermoplastic lattices and thermosetting lattices.

Preferably, within the context of the present invention, the term latex is understood to mean an aqueous dispersion or emulsion of one or more natural or synthetic, generally thermoplastic, polymer substances. The polymer(s) may be self-emulsifiable, or else, in the opposite case, the emulsion or the dispersion is stabilized by appropriate surfactant agents. A latex that is useful within the context of the present invention advantageously has a glass transition temperature $T_g$ of less than 50° C. Ideally, the $T_g$ should be between −50° C. and 25° C., preferably between −20° C. and 10° C., advantageously between −10° C. and 0° C., or even be substantially −5° C. Such $T_g$ ranges make it possible to obtain a stiffness desired for the insulation materials to be applied to a support within the field of the construction of buildings, given that the product obtained is flexible and deformable.

It is preferred to use polymers with a $T_g$ that is at most slightly below ambient temperature in order to ensure the formation of a polymer film which confers adequate properties of the polymer in the cured material. Polymers having $T_g$ values that are not too low are also preferred so that the polymer is not too soft, which would give a material that is too flexible.

Advantageously, the latex contains a polymer, copolymer or terpolymer (or more) of vinyl type, of acrylic type and/or derived from a carboxylic acid. Very particularly, lattices of vinyl type, in particular having pendant ester functions, or based on a copolymer of vinyl chloride and an olefin, whether silanized or not, are preferred. Mention may especially be made of lattices based on vinyl acetate, in particular based on a homopolymer of polyvinyl acetate, or on a copolymer of vinyl acetate and in particular (meth)acrylic acid and/or ester, maleic ester, olefin and/or vinyl chloride, or based on a vinyl chloride/ethylene copolymer. Other advantageous lattices may be chosen from those containing a polymer of acrylic and/or methacrylic type, in particular an acrylonitrile/acrylic ester copolymer or a styrene/silanized acrylic acid or ester copolymer (that is to say, copolymerized with a monomer having an ethylenically unsaturated group bearing at least one silane or silanol function).

The latex could advantageously be a styrene/acrylic copolymer, or an all-acrylic copolymer (derived from various acrylic monomers) obtained by radical polymerization in emulsion or dispersion. These lattices are stabilized by acrylic acid and/or acrylonitrile. Such polymers are sold by BASF in the range referenced by the names Acronal®, in particular Acronal® S 400. It is also possible to use, alternatively or in combination, any latex (a single or several) from this Acronal® range.

Use may advantageously be made of the powders sold by Hexion™ and of the Axilat™ UP range such as Axilat™ UP 620 E. Axilat™ UP 620 E, just like Axilat™ UP 600 B and Axilat™ UP 820 A, are terpolymers of vinyl acetate, vinyl versatate and maleic ester.

The thermal conductivity of the material according to the invention is generally less than or equal to 27 mW/m·K.

Preferably, the thermal conductivity of the material according to the invention is less than or equal to 25 mW/m·K, and is advantageously less than or equal to 23 mW/m·K; particularly preferably, it is less than or equal to 20 mW/m·K, or even less than or equal to 19 mW/m·K.

The densities of the thermal insulation materials obtained according to the invention described previously are generally less than 250 kg/m$^3$.

The densities of the thermal insulation materials obtained according to the invention described previously are typically less than or equal to 150 kg/m$^3$ (by way of comparison, the density of an aerogel block is of the order of 150 kg/m$^3$). Preferably, the density of the insulation material according to the invention is less than or equal to 130 kg/m$^3$ and more preferably 120 kg/m$^3$, advantageously the density is less than or equal to 100 kg/m$^3$, or less than or equal to 85 kg/m$^3$, and even less than or equal to 70 kg/m$^3$, or else less than or equal to 55 kg/m$^3$.

All the combinations of these ranges of thermal conductivity and density values are also possible.

Another subject of the invention is a process for manufacturing the thermal insulation material described previously, comprising the steps consisting in:

a) preparing an aqueous foam;
b) adding at least one binder;
c) adding the aerogel powder while agitating or mixing;
d) leaving the mixture to dry; and
e) optionally carrying out shaping during the drying operation.

Alternatively, it is possible to add the binder directly in step a) during the preparation of the aqueous foam. This aspect is dependent on the binder used: when lattices in powder form are used, it is possible to add the binder after the preparation of the stable aqueous foam, that is to say in step b), whereas when a latex in the form of a dispersion/suspension in a (preferably aqueous) liquid is used, it will preferably be added in step a).

The shaping and drying step may comprise operations of casting or molding said preparation in cavities of suitable shape or cross section. The term molding should be taken in its broadest sense and covers any type of conformation, such as casting in an open mold, extrusion through a die and cutting of the extrudate, etc. Where appropriate, the shaping may be carried out by co-extrusion of the preparation with a polymeric organic phase, and/or with gypsum, in order to produce a surface layer.

The thermal insulation material within the meaning of the invention described previously may be used in the form of at least one layer applied, for example, to a plasterboard. Moreover, such a particularly elastic and deformable insulation material may be impregnated or spread over a web (for example, non-woven, etc.).

Preferably, the aqueous foam is prepared as follows:
a) make a mixture comprising the cationic surfactant foam via agitation;
b) then add an aqueous solution comprising the anionic surfactant.

The inventors have demonstrated that an aqueous foam prepared in this way remains stable throughout the manufacturing process, even after incorporations of other ingredients (aerogel, fillers, adjuvants, etc.).

The present invention and its advantages will be better understood on reading the examples that follow, given solely by way of illustration and that cannot in any case be considered to be limiting:

EXAMPLES

For the thermal conductivity measurements, the protocols used in the examples are:
The conductivity measurement is carried out according to the principle of the Flash method (BALAGEAS, D.—Mesure de la diffusivité thermique par la méthode flash [Measurement of the thermal diffusivity by the Flash method], R 2955, Technique de l'Ingénieur, Traité Mesures et Contrôle—1986), where the thermal excitation is obtained by a flat resistance heater in accordance with the protocol described in the document "Une nouvelle méthode de mesure des propriétés thermophysiques de super-isolants" [A new method of measuring thermophysical properties of super-insulators], Yves Jannot & Alain Degiovanni, conference on infrared thermography for the building industry and public works, Mesurexpo (Villepinte), 2 Oct. 2008.
The characterization temperature varies from 34 to 37° C., and the measurements are carried out at atmospheric pressure.
The accuracy of the measurements is estimated at 5%.
The thermal conductivities were also measured with a NETZSCH™ HFM 436 series flux meter following the protocols established by the standards ASTM C518 and ISO 8301. The samples measured have dimensions of 15×15×5 $cm^3$.

The density is determined by the ratio of the mass of the sample over its volume. The accuracy of this measurement is estimated at 3%.

Example 1

1.1 Preparation of the Aqueous Foam

A kit provided by Allied Foam is used (the percentages are weight contents calculated with respect to the total weight of the compositions):
Component 1 with the commercial reference 425A:
Mixture of cationic surfactant belonging to the class of long-chain alkyls: 50-60%
Mixture of nonionic phenoxyl surfactant: 10-20%
Ethanol: 5-8%
Water: 12-35%
Component 2 with the commercial reference 510B:
Mixture of acrylic polymers: 25-35%
Mixture of anionic surfactant belonging to the class of fatty acids: 15-30%
Water: 35-60%
The foam is generated by a foam generator sold by Allied Foam.
Component 1 is diluted to 136 g per 1 l of water.
Component 2 is introduced directly into the container provided for this purpose.
Alternatively, it will be possible to use the aqueous foam prepared as follows:
Two aqueous solutions (1 and 2) are prepared as follows (the percentages are weight contents calculated relative to the total weight of the solutions after dilution):
Solution 1 (made up to 200 g with distilled water) is prepared by adding 3.2% by weight of Arquad® T50 sold by BASF (49% of propylene glycol, 51% of (tallow) trimethylammonium chloride (64% of C18 alkyl, 31% of C16 alkyl, 4% of C14 alkyl and 1% of C12 alkyl, in suspension in propylene glycol) in suspension in water) and 0.65% by weight of Triton® X-405 sold by Dow Chemical (70% of octylphenol ethoxylate).
Solution 2 (made up to 40 g with distilled water) is prepared by adding 5% of potassium stearate.
Solution 1 is introduced into a high-speed mixer (Kenwood Major 1800 watts kitchen mixer). Solution 2 is added to and mixed with the foam obtained by this first mixing operation.

1.2 Conversion of the Aqueous Foam to Finished Product 250 g of freshly obtained aqueous foam are weighed, added to which are 100 g of styrene/acrylic ester copolymer (latex) in aqueous solution (Acronal® S 400, BASF, the latex content of which is 57%).
Once this latex-reinforced foam is obtained, three doses of silica aerogels (Nanogel® TLD 302) screened to a particle size of less than or equal to 250 µm were added to the foam: 70 g, 90 g and 100 g, which correspond respectively to samples 2, 3 and 4 from table 1.
The silica aerogels used for the implementation of the invention are produced by Cabot: they are in the form of millimeter-sized granules, which it was necessary to mill and to screen in order to obtain the desired particle size for the test. The screening is carried out by milling the aerogels above a screen for which the mesh width is 250 µm. The powder recovered after the screening thus has a particle size of less than or equal to 250 µm.
The aerogel powder is introduced into the foam during the mixing; this operation lasts for around 5 minutes.
Following the mixing of the reinforced foam with the aerogel powder, an increasingly compact paste is obtained depending on the amount of aerogels introduced, which remains, however, relatively easy to spread and to handle in order to give it various shapes.

Once dried (48 hours at ambient T or 24 hours in an oven at 50° C., for example), the paste, which has undergone a weight loss of around 50%, has cured and is in the form of a solid having a certain flexibility, this flexibility also depending on the amount of aerogels present in the mixture.

Measurements of the density and of the thermal conductivity were carried out on the aerogel powder and on the three samples produced (samples 2, 3 and 4 from table 1) once cured. The values measured are summarized in table 1, by way of comparison the values measured for the aerogel powder screened alone (entry 1 of the table) have been listed:

TABLE 1

| Sample No. | Density [kg/m³] | Thermal conductivity λ [mW/m · K] |
|---|---|---|
| 1 Aerogel powder alone screened to 250 μm | 83 | 21.6 |
| 2 (70 g of aerogels) | 121 | 18.1 |
| 3 (90 g of aerogels) | 125 | 18.8 |
| 4 (100 g of aerogels) | 144 | 19.7 |

Regarding the three samples 2, 3 and 4, the aerogels are present in the final product at a content of around 50% of the overall volume.

Regarding sample 2 from table 1, a paste is obtained that is more flexible in the fresh state and less rigid once cured; whereas for sample 4 a paste is obtained that is more compact in the fresh state and more rigid once cured.

Example 2

The protocol is identical to that of example 1, but the silica aerogels (Nanogel® TLD 302) are not screened. Thus the aerogels were not subjected to screening, but inserted into the mixture in the form of millimeter-sized granules.

The change in the size of the aerogels makes it possible to introduce a larger amount thereof into the latex-reinforced foam: 140 g. This is because the foam does not undergo settling and/or collapse, which phenomenon is observed during the manufacture of the sample during the introduction of the aerogels having a particle size of less than or equal to 250 μm.

Once shaped and dried for 48 h at 50° C., the sample, referred to as sample 5, was subjected to a thermal conductivity measurement. When the product is particularly flexible and aerated, it was necessary to press the sample between the plates of the measurement device in order to obtain a thermal conductivity value for a given corresponding density.

The results are presented in table 2.

TABLE 2

| Sample No. | Density [kg/m³] | Thermal conductivity λ [mW/m · K] |
|---|---|---|
| 5 | 98 | 22.5 |

Example 3

3.1 Preparation of the Aqueous Foam

Two aqueous solutions (1 and 2) are prepared as follows (the percentages are weight contents calculated relative to the total weight of the solutions after dilution):

Solution 1 is prepared by adding 3.2% by weight of Arquad® T50 sold by BASF (49% of propylene glycol, 51% of (tallow)trimethylammonium chloride (64% of C18 alkyl, 31% of C16 alkyl, 4% of C14 alkyl and 1% of C12 alkyl, in suspension in propylene glycol) in suspension in water) and 0.65% by weight of Triton® X-405 sold by Dow Chemical (70% of octylphenol ethoxylate), the whole mixture is added to a solution of distilled water in order to obtain an aqueous solution of 200 g.

Solution 2 is prepared by adding 5% by weight of potassium stearate to a solution of distilled water in order to obtain an aqueous solution of 40 g.

Solution 1 is introduced into a high-speed mixer (Kenwood Major 1800 watts kitchen mixer) and foaming is carried out by stirring at maximum speed for 2 minutes. Solution 2 is added to this first foam. The assembly is stirred at maximum speed for 2 minutes in order to obtain the stable aqueous foam.

3.2 Conversion of the Aqueous Foam to Finished Product

Preparation of Samples 1 and 2

230 g of the stable aqueous foam freshly prepared according to the protocol described in 3.1 are weighed, added to which is an inorganic binder formed from a plaster blend formed from plaster powder, optionally from sodium silicate (NaO/SiO$_2$.3H$_2$O) powder, and from a powdered organic latex of vinyl terpolymer type (Axilat® UP 620 E, Hexion, the latex content of which is 90-95%) with a solid/water ratio in the blend of 10:9 by weight. The stirring is continued in the mixer: this is now a kneading operation given that the foam becomes increasingly pasty.

Then for 5 minutes, during the kneading operation, incorporated into the foamed mixture are the silica aerogels sold by Cabot (Nanogel® TLD 302), a fraction of which is screened to a particle size of less than or equal to 250 μm. During the kneading operation, over time, an increasingly compact paste is obtained, depending on the amount of aerogels introduced, which remains, however, relatively easy to spread and to handle in order to give it various shapes.

Once dried (48 hours at ambient T or 24 hours in an oven at 50° C., for example), the paste, which has undergone a mass loss of around 50%, has cured and is in the form of a solid having a certain flexibility, this flexibility also being dependent on the amount of aerogels present in the mixture.

The amounts of reactants used and the experimental results are listed in table 3.

Example 4

4.1 Preparation of the Aqueous Foam

Two aqueous solutions (1 and 2) are prepared as follows (the percentages are weight contents calculated relative to the total weight of the solutions after dilution):

Solution 1 is prepared by adding 3.2% by weight of Arquad® T50 sold by BASF (49% of propylene glycol, 51% of (tallow)trimethylammonium chloride (64% of C18 alkyl, 31% of C16 alkyl, 4% of C14 alkyl and 1% of C12 alkyl, in suspension in propylene glycol) in suspension in water) and 0.65% by weight of Triton® X-405 sold by Dow Chemical (70% of octylphenol ethoxylate), the whole mixture is added to a solution of distilled water in order to obtain an aqueous solution of 200 g.

Solution 2 is produced by preparing an aqueous solution (distilled water) of 40 g containing 5% by weight of potassium stearate, to which is added, under stirring carried out by the operator using a spatula, 25-38% by weight of an organic binder of styrene/acrylic ester copolymer type (latex) in aqueous solution (Acronal® S400, BASF, the latex content of which is 57%).

Solution 1 is introduced into a high-speed mixer (Kenwood Major 1800 watts kitchen mixer) and foaming is carried out by stirring at maximum speed for 2 minutes. Solution 2 is added to this first foam. The assembly is stirred at maximum speed for 2 minutes in order to obtain the stable aqueous foam.

4.2 Conversion of the Aqueous Foam to Finished Product

Preparation of Samples 3 and 4

Incorporated into 230 g of the stable aqueous foam freshly prepared according to the protocol described in 4.1 is an inorganic binder formed from a plaster blend, and optionally from sodium silicate (NaO/SiO$_2$.3H$_2$O): the solid/water ratio in the blend is 1:1 by weight. The stirring is continued in the mixer at low speed: this is now a kneading operation given that the foam becomes increasingly pasty.

Then for 5 minutes, during the kneading operation, incorporated into the foamed mixture are the silica aerogels sold by Cabot (Nanogel® TLD 302), a fraction of which is screened to a particle size of less than or equal to 250 µm. During the kneading operation, over time, an increasingly compact paste is obtained, depending on the amount of aerogels introduced, which remains, however, relatively easy to spread and to handle in order to give it various shapes.

Once dried (48 hours at ambient T or 24 hours in an oven at 50° C., for example), the paste, which has undergone a mass loss of around 50%, has cured and is in the form of a solid having a certain flexibility, this flexibility also being dependent on the amount of aerogels present in the mixture.

The amounts of reactants used and the experimental results are listed in table 3.

Example 5

5.1 Preparation of the Aqueous Foam

Two aqueous solutions (1 and 2) are prepared as follows (the percentages are weight contents calculated relative to the total weight of the solutions after dilution):

Solution 1 is prepared by adding 3.2% by weight of Arquad® T50 sold by BASF (49% of propylene glycol, 51% of (tallow)trimethylammonium chloride (64% of C18 alkyl, 31% of C16 alkyl, 4% of C14 alkyl and 1% of C12 alkyl, in suspension in propylene glycol) in suspension in water) and 0.65% by weight of Triton® X-405 sold by Dow Chemical (70% of octylphenol ethoxylate), the whole mixture is added to a solution of distilled water in order to obtain an aqueous solution of 200 g.

Solution 2 is prepared by adding 5% by weight of potassium stearate to a solution of distilled water in order to obtain an aqueous solution of 40 g.

Solution 1 is introduced into a high-speed mixer (Kenwood Major 1800 watts kitchen mixer) and foaming is carried out by stirring at maximum speed for 2 minutes. Solution 2 is added to this first foam. The assembly is stirred at maximum speed for 2 minutes in order to obtain the stable aqueous foam.

5.2 Conversion of the Aqueous Foam to Finished Product

Preparation of Sample 5

Incorporated into 230 g of the stable aqueous foam freshly prepared according to the protocol described in 5.1 is an inorganic binder formed from a plaster blend, and optionally from sodium silicate (NaO/SiO$_2$.3H$_2$O): the solid/water ratio in the blend is 1:1 by weight. The stirring is continued in the mixer: this is now a kneading operation given that the foam becomes increasingly pasty.

Then for 5 minutes, during the kneading operation, incorporated into the foamed mixture are the silica aerogels sold by Cabot (Nanogel® TLD 302), a fraction of which is screened to a particle size of less than or equal to 250 µm. During the kneading operation, over time, an increasingly compact paste is obtained, depending on the amount of aerogels introduced, which remains, however, relatively easy to spread and to handle in order to give it various shapes.

Once dried (48 hours at ambient T or 24 hours in an oven at 50° C., for example), the paste, which has undergone a mass loss of around 50%, has cured and is in the form of a solid having a certain flexibility, this flexibility also being dependent on the amount of aerogels present in the mixture.

The amounts of reactants used and the experimental results are listed in table 3.

TABLE 3

|  | Sample 1 | Sample 2 | Sample 3 | Sample 4 | Sample 5 |
| --- | --- | --- | --- | --- | --- |
| Plaster (weight) | 50 g | 90 g | 70 g | 90 g | 90 g |
| NaO/SiO$_2$•3H$_2$O (weight) | 50 g | — | 10 g | — | — |
| latex (total mass of the commercial product) | Axilat UP 820A 20 g | Axilat UP 820A 10 g | Acronal S 400 10 g | Acronal S 400 15 g | — |
| Water in the blend (without foam) | 100 g | 90 g | 80 g | 90 g | 90 g |
| Aerogels screened to 250 µm (weight) | 35 g | 35 g | 35 g | 35 g | 35 g |
| Aerogels, unscreened (weight) | 50 g | 50 g | 50 g | 50 g | 50 g |

TABLE 3-continued

| | Sample 1 | Sample 2 | Sample 3 | Sample 4 | Sample 5 |
|---|---|---|---|---|---|
| Density [kg/m$^3$] | 230 | 230 | 204 | 168 | 225 |
| Thermal conductivity λ [mW/m·K] | 25 | 24 | 21.8 | 22 | 26 |

The invention claimed is:

1. A thermal insulation material obtained from a mixture comprising:
an aqueous foam;
silica aerogel particles; and
a binder comprising an organic binder and/or a mineral binder,
wherein the aqueous foam comprises:
(i) a cationic surfactant salt of formula (I):

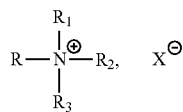

(I)

wherein:
R is an aliphatic chain having from 8 to 24 carbon atoms;
$R_1$ is an alkyl group comprising from 1 to 16 carbon atoms, a hydroxyalkyl comprising from 1 to 16 carbon atoms, a benzyl group, or a group which, taken together with the nitrogen of formula (I), forms a heterocycle optionally substituted by a fluorine atom;
$R_2$ and $R_3$ are each independently an alkyl group comprising from 1 to 6 carbon atoms, a hydroxyalkyl comprising from 1 to 6 carbon atoms, a hydrogen atom, a benzyl group, a group which, taken together with the nitrogen of formula (I), forms a heterocycle optionally substituted by a fluorine atom; and
$X^-$ is a counteranion; and
(ii) an anionic surfactant salt of formula (II):

(II)

wherein:
R is an aliphatic chain having from 10 to 24 carbon atoms;
$X^-$ is a group bearing a negative charge selected from the group consisting of a carboxylate a sulfate, and a phosphate group: and
$Y^+$ is a countercation selected from the group consisting of an ammonium, a sodium, and a potassium groups; and group, and
wherein a weight ratio of the cationic surfactant salt to the anionic surfactant salt is from 0.05:1 to 15:1.

2. The thermal insulation material of claim 1, wherein the mixture comprises, relative to a total weight of the mixture:
from 25 to 75% of the aqueous foam,
from 5 to 35% of the silica aerogel particles, and
from 5 to 35% of the binder.

3. The thermal insulation material of claim 2, wherein the mixture comprises, relative to a total weight of the mixture:
from 35 to 65% of aqueous foam,
from 17 to 25% of silica aerogel particles, and
from 17 to 25% of the binder.

4. The thermal insulation material of claim 1, wherein the cationic surfactant salt is at least one salt selected from the group consisting of dodecyltrimethylammonium bromide, dodecyltrimethylammonium chloride, tetradecyltrimethylammonium bromide, tetradecyltrimethylammonium chloride, hexadecyltrimethylammonium bromide, hexadecyltrimethylammonium chloride, octadecyltrimethylammonium bromide, octadecyltrimethylammonium chloride, cetyltrimethylammonium bromide, cetyltrimethylammonium chloride, cetylbenzyldimethylammonium chloride, cetyltriethylammonium bromide, and (tallow)trimethylammonium chloride.

5. The thermal insulation material of claim wherein the cationic surfactant salt is (tallow)trimethylammonium chloride.

6. The thermal insulation material of claim 1, wherein the anionic surfactant salt is at least one salt selected from the group consisting of ammonium stearate, potassium stearate, and sodium stearate.

7. The thermal insulation material of claim 1, wherein the aqueous foam comprises a mixture comprising water, glycerol, a surfactant, and a zwitterion.

8. The thermal insulation material of claim 7, wherein the aqueous foam comprises from 35 to 45% of glycerol.

9. The thermal insulation material of claim 7, wherein the aqueous foam comprises less than 0.5% of dodecyl polyoxyethylene-3-sulfate, less than 0.5% of cocamidopropyl betaine, and less than 0.05% of myristic acid.

10. The thermal insulation material of claim 1, wherein the binder is a latex.

11. The thermal insulation material of claim 10, wherein the latex has a glass transition temperature $T_g$ below 50° C.

12. The thermal insulation material of claim 1, having a thermal conductivity of less than or equal to 23 mW/m·K.

13. The thermal insulation material of claim 1, having a thermal conductivity of less than or equal to 19 mW/m·K.

14. The thermal insulation material of claim 1, having a density of less than or equal to 150 kg/m$^3$.

15. The thermal insulation material of claim 1, having a density of less than or equal to 100 kg/m$^3$.

16. A process for manufacturing the thermal insulation material of claim 1, the process comprising:
mixing the aqueous foam with a binder, thereby forming an intermediate mixture;
adding a silica aerogel powder to the intermediate mixture while agitating or mixing, thereby obtaining the mixture; and
drying the mixture, thereby obtaining the thermal insulation material.

17. The process of claim 16, further comprising shaping the material during the drying.

* * * * *